(12) United States Patent
Rupe et al.

(10) Patent No.: US 6,668,056 B2
(45) Date of Patent: Dec. 23, 2003

(54) SYSTEM AND METHOD FOR MODELING RESOURCES FOR CALLS CENTERED IN A PUBLIC SWITCH TELEPHONE NETWORK

(75) Inventors: Jason Rupe, Lafayette, CO (US); Weiren Wang, Redmond, WA (US); George Bell, Boulder, CO (US); Richard Berger, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 191 days.

(21) Appl. No.: 09/818,040

(22) Filed: Mar. 27, 2001

(65) Prior Publication Data

US 2002/0181689 A1 Dec. 5, 2002

(51) Int. Cl.$^7$ .............................................. H04M 3/00
(52) U.S. Cl. ........................ 379/266.03; 379/266.06
(58) Field of Search .................. 379/265.06, 265.9, 379/266.01, 266.03, 266.06, 266.07, 266.08, 309

(56) References Cited

U.S. PATENT DOCUMENTS 6,044,355 A  *  3/2000 Crockett et al. ................ 705/8
6,449,358 B1 *  9/2002 Anisimov et al. ...... 379/266.07

* cited by examiner

Primary Examiner—Ahmad F. Matar
Assistant Examiner—Quynh H. Nguyen
(74) Attorney, Agent, or Firm—Marsh Fischmann & Breyfogle LLP

(57) ABSTRACT

A system and method provide for the modeling of a virtual call center for PSTNs in specified geographic locations. The system includes a user interface through which basic configuration and forecast information may be input for one or more PSTNs. Based on the information provided through the interface, various financial and engineering rules are employed to identify an optimal system configuration and to provide cost and revenue information with regards for that system. In configuring the optimal system, a number of fault and failure modes may be taken to account.

25 Claims, 6 Drawing Sheets

Figure 1:
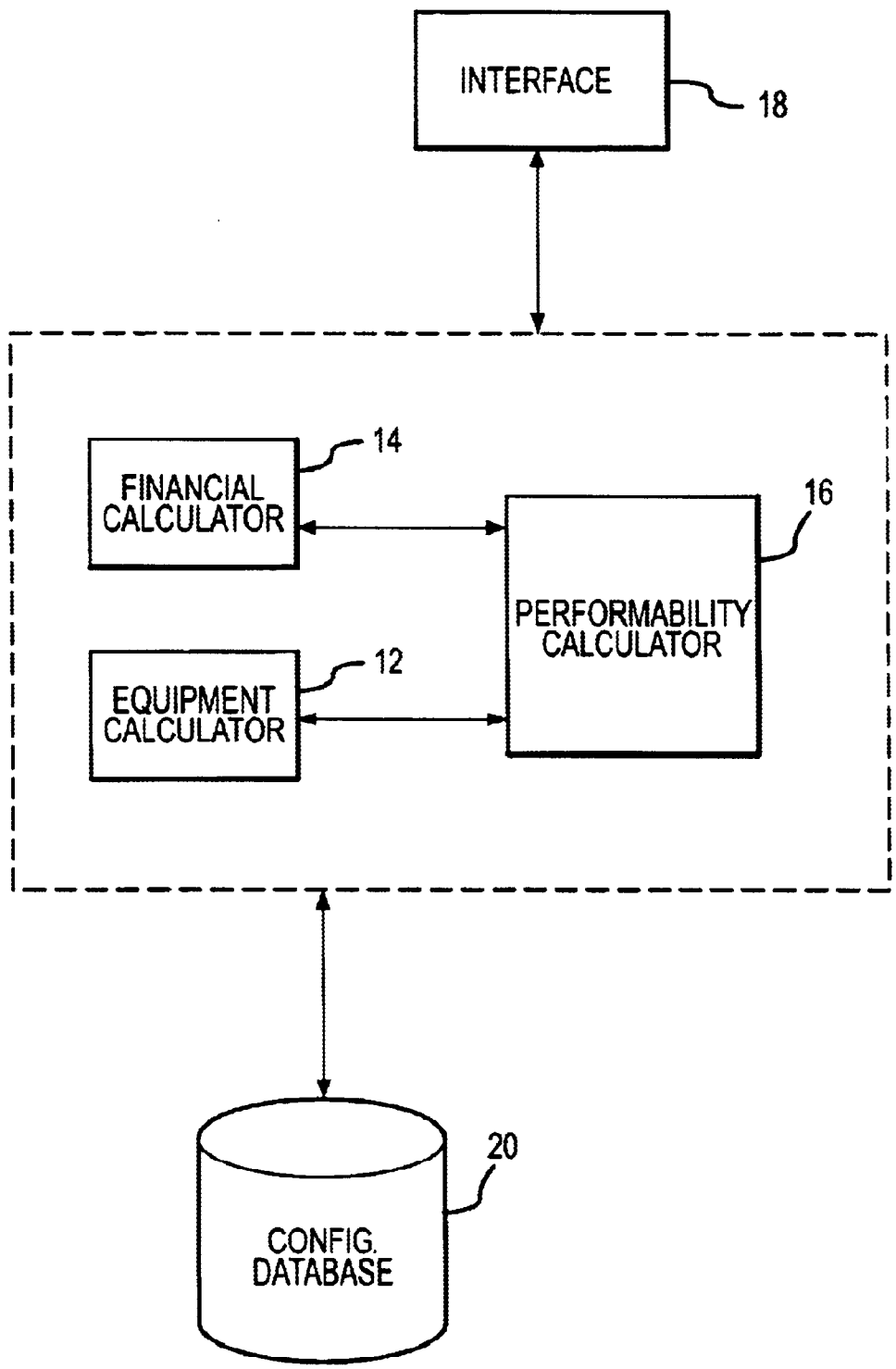

PHOENIX
PORTS PER VRU, CARD 23

| CITY | YEAR | TYPE | % INCR | QTY | AVE NO OF AGENTS | BUSY HR CALL RATE | %ACD CALLS | % IVR CALLS | % IVR & ACD CALLS | CALL RATE- ACD | CALL RATE- IVR | HOLDING TIME | BLOCKING PROB | YEARLY CALL VOLUME (K) | TOTAL VRU PORTS |
|---|---|---|---|---|---|---|---|---|---|---|---|---|---|---|---|
| PHOENIX | 2000 | A | | 50 | 5 | 12.0 | 30% | 50% | 20% | 6.0 | 8.40 | 2.0 | 0.100 | 26208.0 | |
| PHOENIX | 2000 | B | | 30 | 10 | 12.0 | 30% | 50% | 20% | 6.0 | 8.40 | 2.0 | 0.100 | 15724.8 | |
| PHOENIX | 2000 | C | | 10 | 20 | 12.0 | 30% | 50% | 20% | 6.0 | 8.40 | 2.0 | 0.100 | 5241.6 | |
| PHOENIX | 2000 | D | | 5 | 30 | 12.0 | 30% | 50% | 20% | 6.0 | 8.40 | 2.0 | 0.100 | 2620.8 | |
| PHOENIX | 2000 | E | | 2 | 50 | 12.0 | 30% | 50% | 20% | 6.0 | 8.40 | 2.0 | 0.100 | 1048.3 | |
| PHOENIX | 2000 | F | | 3 | 60 | 12.0 | 30% | 50% | 20% | 6.0 | 8.40 | 2.0 | 0.100 | 1572.5 | |
| 30 | 32 | 34 | | 36 | 38 | 40 | 42 | 44 | 46 | 48 | 50 | 52 | 54 | 56 | |

FIG.3

SYSTEM AND METHOD FOR MODELING RESOURCES FOR CALLS CENTERED IN A PUBLIC SWITCH TELEPHONE NETWORK

FIELD OF THE INVENTION

The present invention relates to a tool for modeling a communications system in connection with a public switch telephone network, and more particularly to a tool for modeling the equipment and budget requirements in an interactive voice response (IVR) system into one or more geographic areas over one or more predetermined time periods.

BACKGROUND OF THE INVENTION

Many companies today employ a call center to process any number of customer inquiries. These inquiries relate to such things as information with regards to accounts the customer may have with the business, information about a business' products, contacting employees within the business, etc. Typically, a call center will include a number of components which provide for the automatic answering and routing of telephone calls received. One component may be the automatic call distributor (ACD) which is a specially configured computer which, based on information either extracted from the call or the caller, routes the telephone call within the system to the appropriate destination. These destinations may include a live agent (person) or other systems such as a voice response unit (VRU).

A VRU is a specially configured computer which provides synthesized voice messages as part of a voice recognition system or in response to detected use of a touch tone pad on a telephone. Based on inputs received via the touch tone pad, a VRU may access any number of data files, and upon identifying and retrieving information stored therein, providing an appropriate voice response. An interactive voice response unit (IVR) is a more sophisticated version of the VRU which employs snippets of recording of human voice or synthesized voice to provide responses. An IVR may take an existing database and make it available by phone for other media such as fax, e-mail, or simultaneous voice and data (SVD) components. The IVR provides access to and stores information, as well as performs record keeping and makes sales 24 hours a day. An IVR may be used as a front end for an ACD. The IVR system can ask questions that help with routing and enable more intelligent and informed call processing. An IVR can add interactive value to what otherwise would be a wait time by broadcasting additional information about the particular company the caller is contacting.

In employing a modem call center solution, local telephone companies are providing these services in a "virtual" manner in which a number of the necessary components are located at one or more central office switches and these components may be shared amongst a number of different customers. This provides a dual advantage in that customers who wish to establish a call center do not have to purchase and install some customer premise equipment (CPE) associated with operating a call center. This type of situation is also advantageous to a telephone company in that equipment employed for providing call center services may be provided to multiple customers thus such that the capacity of the equipment may be maximized. This in essence provides additional revenue stream for the telephone company.

SUMMARY OF THE INVENTION

The inventors have recognized that where virtual call center capabilities are being provided within the public switch telephone network (PSTN), the network must be configured in such a way that the services can be provided to all the parties who wish to employ them, and that the costs and equipment needs necessary in modifying the network are easily identifiable. Further, the inventors have recognized that although the system may be conceptually configured to meet a desired blocking rate, it would be more advantageous, to configure the system to analysis it in light of a plurality of fault situations such that the long term expected blocking incurred in a particular system is less than or equal to a desired overall blocking.

Disclosed herein is a system and method for modeling a telephony system which is employable on a single computer platform or over a data network. In one configuration of the invention, the system is employable for modeling an automated call center which is to be incorporated in one or more locations in a PSTN and will provide services for a plurality of customers. The system described herein may be further configured to identify an optimal system for a plurality of geographic locations and/or over a plurality of time periods.

Included in the system is a base configuration calculator which is employable to identify a base configuration for the system based on an ideal blocking value entered in the system through an interface. Other information entered into the system in order to identify the base configuration may include forecasted telephone traffic for the system in a particular geographic region over one or more time periods.

The base configuration calculator may identify through the calculations performed using the ideal blocking value and the forecasted telephonic traffic, a number of a first component employed in the system. As an example, the first component may comprise an application server employable in the telephony network which may include one or more additional components incorporated therein. These additional components may include one or more voice response units (VRU), or one or more VRU cards incorporated into the VRU.

Once a base configuration for the call center system is identified which meets the ideal blocking value, a performability calculator may then be employed to calculate a long term expected blocking value for the base configuration. Employed by the performability calculator are a number of failure scenarios for one or more components included in the base configuration. For example, one or more of the application servers, VRU's, and VRU cards are simulated to be failed and a long term expected blocking value is calculated taking into account such failure.

A recursion is employed to calculate the long term expected blocking value for the particular base configuration. If it is found that the long term expected blocking value for the particular configuration is greater than the desired blocking value, the system configuration is modified to increase one or more of the components included therein. For example, the number of application servers, VRU's, and VRU cards may be increased in a systematic manner, and then each modified configuration analyzed to identify a long term expected blocking value. Once a system configuration is identified which has a long term expected blocking value less than or equal to the desired blocking value, this is identified as the optimal system configuration and information relating to this system may be presented to a system users through an interface.

In another configuration of the invention, a financial calculator may also be included as part of the system which based on the optimal configuration identified, may extract financial information about the configuration and provide cost information for billing and maintaining the particular system. Further, the financial calculator may be configured to provide revenue information for the optimal configuration based on forecasted call traffic information. This information may be presented to a system user along with the optimal configuration through a computer system interface in a desired format.

In operation, a system user may enter a desired blocking value and forecast information for the desired telephony system through an interface. This provided information may include forecasted system demand which may be by geographic location, and may include such values as the number of customers who employ the system, the type of customer, call rates per locations and holding times. Further, different desired blocking values may be entered for each system user. Based on this provided information, call volume for one or more geographic locations may be calculated, and this value may be employed along with the desired blocking value to identify a one or more components (i.e., application servers, VRUs, and VRU cards) to be employed in the base configuration.

As a next step, the number of additional components may be extrapolated using provided relationships, to identify an entire base configuration for the telephony system. Once the base configuration is identified, performability calculations may be performed which identify the long term expected blocking for the base configuration taking into account one or more failure modes and associated failure rates. The base configuration is continually modified until a optimal system configuration is identified which has a long term expected blocking value less than or equal to the blocking value entered by a system user.

The optimal system configuration may then be compiled in a desired format and presented on a user interface, or output in a desired manner. As mentioned above, other calculations may be performed with regards to the optimal system; such as costs for implementing and running the particular system, as well has revenues which may be earned that during operation of the system.

DETAILED DESCRIPTION OF THE DRAWINGS

FIG. 1 discloses a system diagram which includes components of the modeling system described herein.

Figure 2:
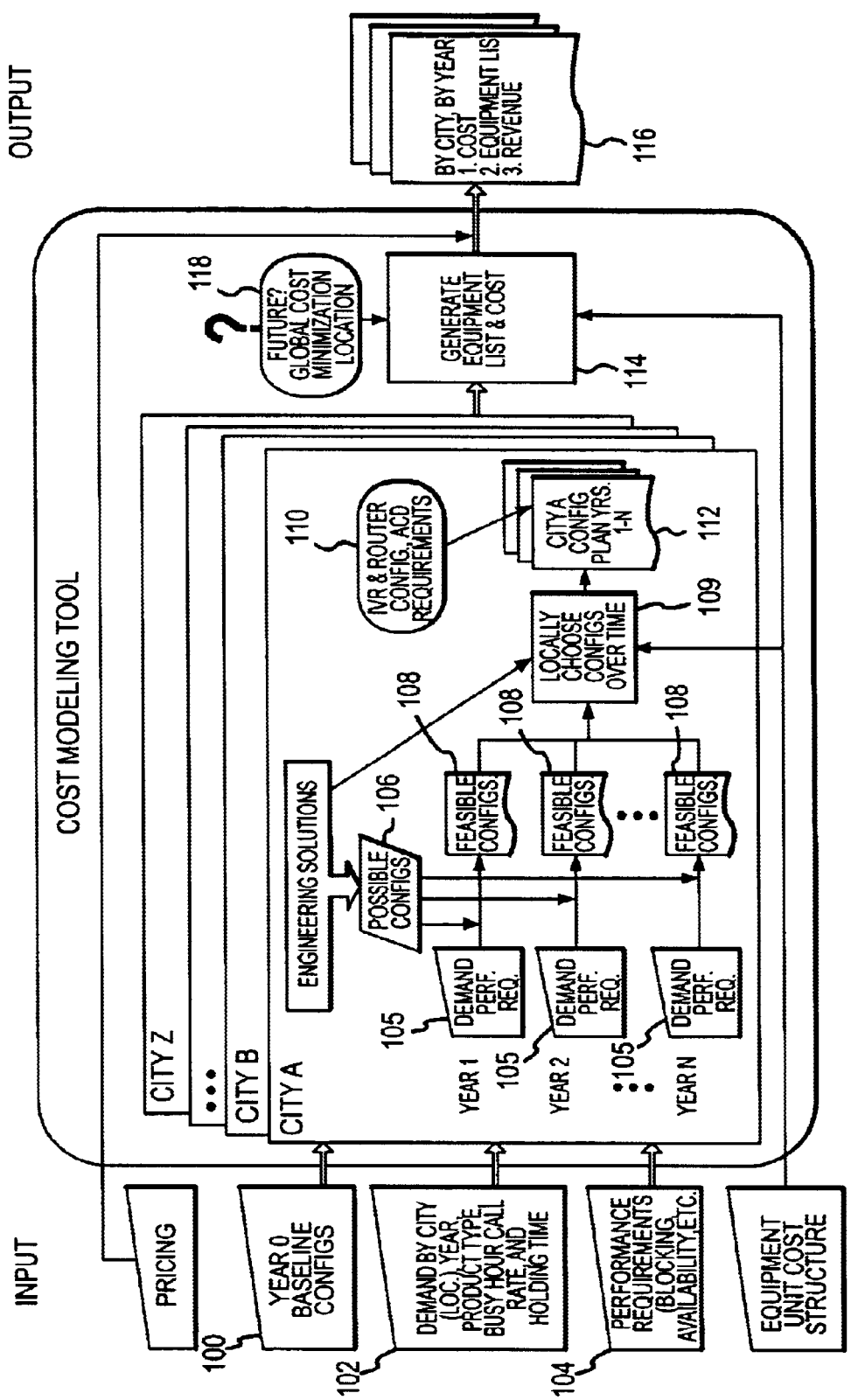

FIG. 2 discloses a block diagram which shows eight number of these steps performed in that generating financial and performability information.

FIG. 3 discloses a table which includes example values for call processing capabilities in a specified geographic region.

Figure 4:
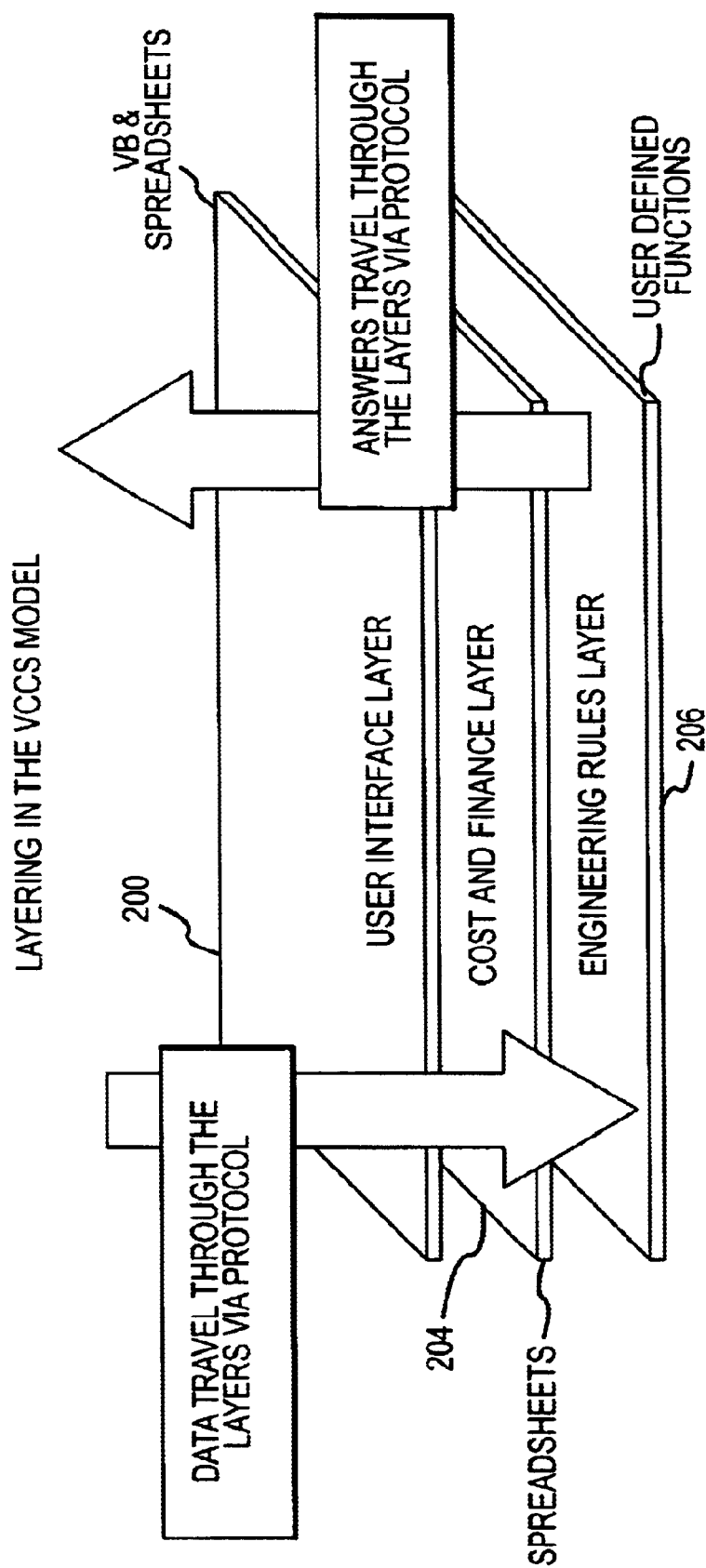

FIG. 4 discloses a diagram which shows conceptually the layers of processes performed in providing performability and financial information with regards to modeling a telephone network.

Figure 5:
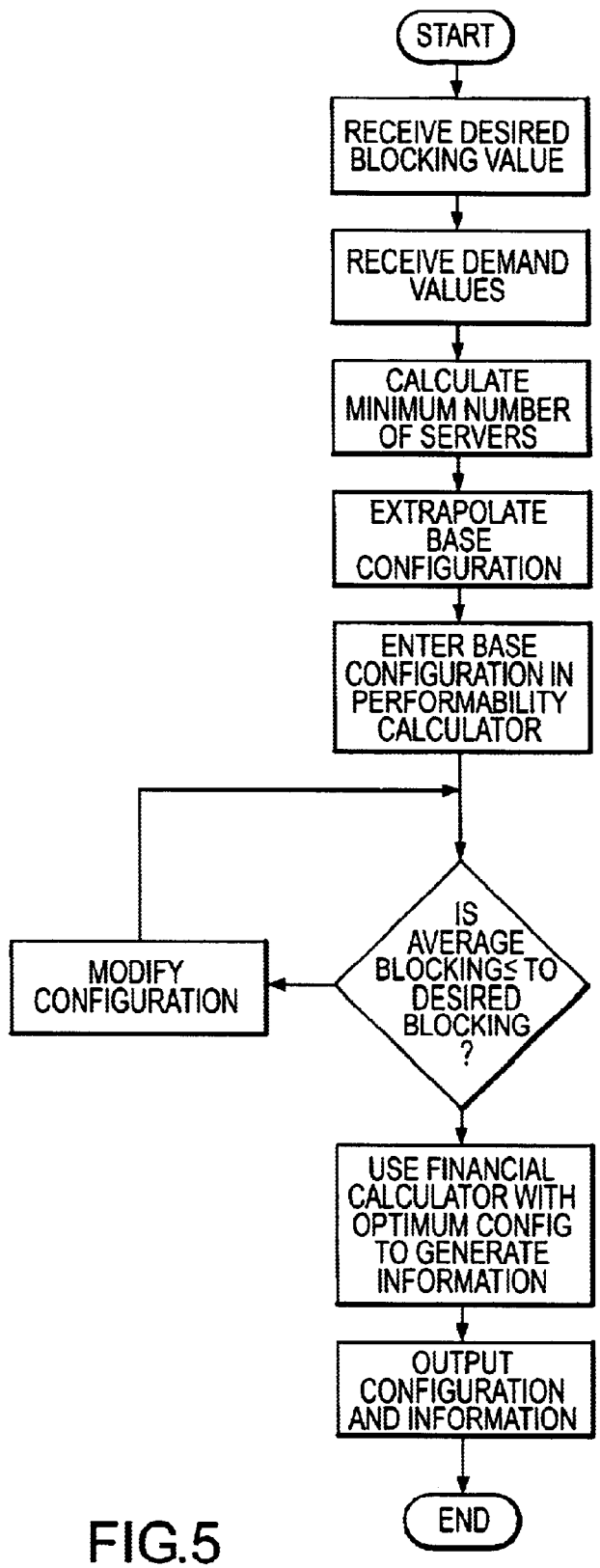

FIG. 5 discloses a flowchart which describes the overall operations of the system described herein with regards to identifying an optimal configuration and providing cost information with regards to such configuration.

Figure 6:
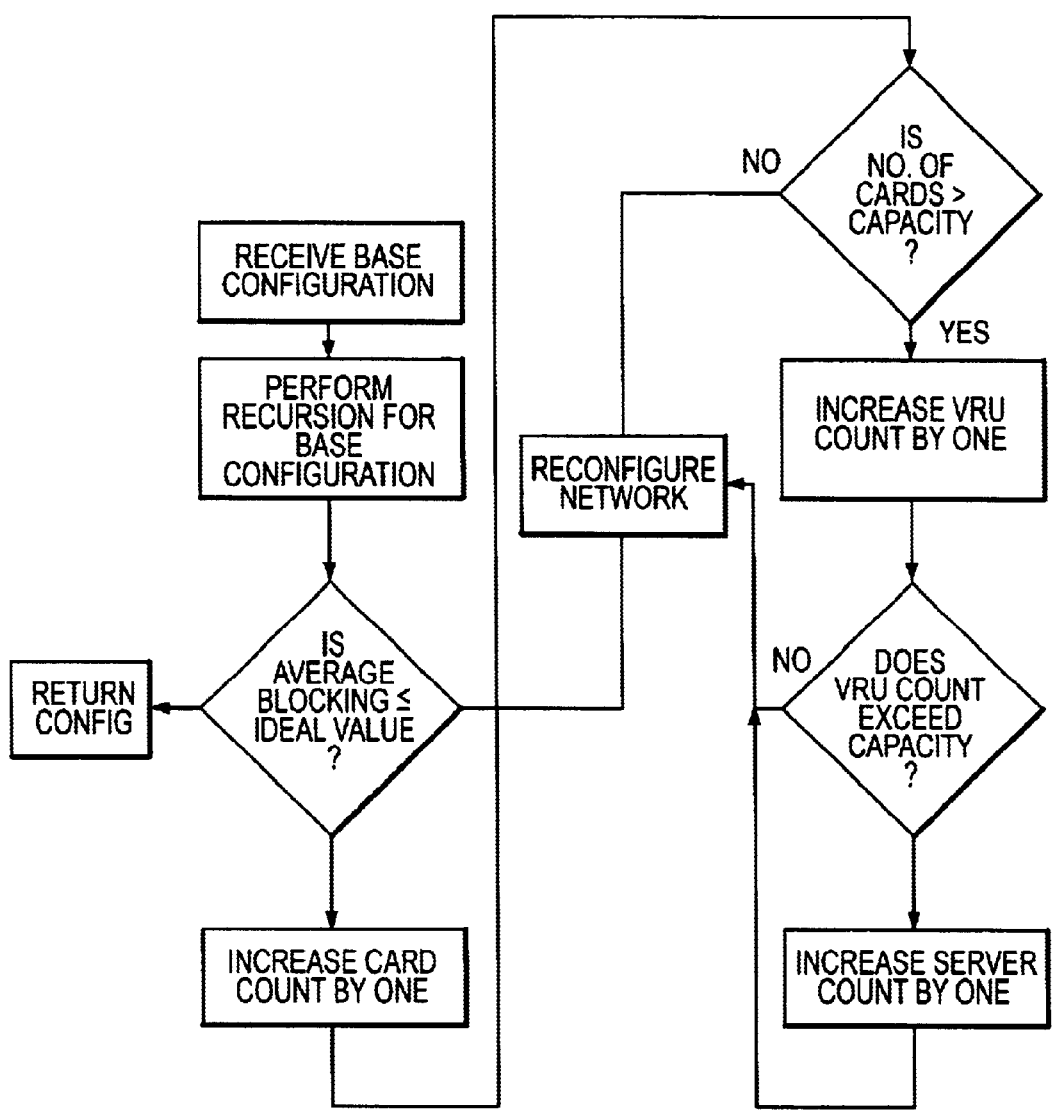

FIG. 6 discloses a flowchart which discloses steps executed as part of the performability calculations to identify an optimal configuration.

DETAILED DESCRIPTION

Disclosed in FIG. 1 is a block diagram for the modeling system described herein. In one configuration of the invention, the modeling system described herein may be resident on a computing device such as a personal computer. The personal computer may be configured such that one or more processing modules are provided therein for performing the various functions of the invention. Further, the system may be implemented using any number of different database type software (for example Excel, Microsoft Access, etc., which provide for the programming of macros therein).

Referring again to FIG. 1, residing on the computing platform 10 may be a number of processing modules employable to generate various types of information used in the modeling process described herein. Included are a performability calculator 16 which is employable to determine the average blocking value for a virtual call center configured in a PSTN, taking into account traffic load, system capacity, and failures of various components. The performability calculator 16 includes the functionality to modify the system configuration such that particular blocking values may be attained. In modifying the configuration the performability calculator may employ various engineering rules which provide direction as to how various components within the system may be distributed. The specific functions of the performability calculator 16 will be described in greater detail below.

Also included in the computing platform 10 is an equipment calculator 12. The equipment calculator 12 is configured to identify relationships between particular components in the call center system such that upon identifying that a particular component is necessary for the system, other components, which operate within or in relation to the original component, may be identified. For example, in a call center environment, it is known that an application server may only hold so many VRU cards, and if a requirement for a particular number of cards exceeds this value, the equipment calculator is employable to determine that an additional server may be necessary to carry the additional cards. Further, if it is identified that a number of VRU ports are necessary to provide the desired performance of the system, a related number of cards are provided therewith. The equipment calculator includes the functionality to retrieve these relationships and extrapolate to generate an optimal system configuration.

The financial calculator 14 operates in conjunction with the performability calculator 16 and the equipment calculator 12 to retrieve cost information for components employed in the optimal system configuration, and to perform financial calculations as to the building and maintaining a particular call center configuration. Calculations performed by the financial calculator may include the capital expense and maintenance costs for the equipment, fees paid for various agreements between parties, as well as one time and recurring costs for establishing and maintaining the call center.

In order to input and view information in the system an interface 18 is provided which is connectable to computing platform 10. In one configuration of the invention, the interface may comprise a computer monitor, keyboard and mouse. The interface may be configured such that information needed to identify the optimal configuration may be entered, and interactive screen displays may be presented in a preferred format which include information relating to the configuration of the call center. Also in connection with the computing platform 10 may be a database 20 which is employable to store the various types of information employed by the processing modules included in the system described herein.

The system described herein is employable for calculating the design for a shared resource IVR based on call blocking due to call traffic load, IVR capacity, and IVR failures. In short, the system takes customer specific information and product specific information, and using design guidelines, calculates a preliminary design based on a desired blocking requirement. Once this preliminary design is identified, the system iteratively grows this design and searches for a system configuration which meets the blocking requirement after considering the various equipment failure modes and rates. Although a linear growth method is described herein, one skilled in the art would realize that other search techniques may be employed. This system may be applied to any realistic scenario defined by customer's traffic over a time period which may be part of contracted service, engineering rules, and a product set.

Disclosed in FIG. 2 is a block diagram for the modeling tool which shows in particular the types of information users input into the system, the engineering performed to develop the optimal configuration, and the output which includes the costs, equipment lists, as well as potential revenue generated through use of the system. As can be seen, the system employed herein may provide information as to the system configuration over a number of different years for multiple geographic locations (i.e., cities). Information which may be input includes a year zero baseline configuration 100 for all of the cities for which an analysis is going to be provided. This baseline configuration 100 includes the equipment which would be employed to provide a basic level of performance at the first year of deployment (Year 0).

Other information which may be entered into the system initially includes demand information for a geographic location 102 as well as performance requirements 104 desired for the particular geographic location. Disclosed in FIG. 3 is a table which includes a listing of the types of information which may be included in the demand information 102 and the performance requirements 104. These items may comprise the geographic location of the call center 30, the time period 32 in which the calculation is to be made, as well as the type of client 34. In providing a call center system which may be employable in the network, it is envisioned that the different customers will have different performance needs. As such, in column 34 they are classified according to their particular needs. In column 36 a number of a particular type of customer (a particular type may just have one customer) is listed, and in column 38 the average number of agents which a particular customer may employ is provided.

The remaining columns in the table relate to the types of traffic which are projected, and more specifically, the manner in which the particular call should be handled and the type of call received. In column 38, the busy hour call rate is listed which is the number of calls a particular location may receive during its busy hour. Column 42 discloses the percentage of incoming calls at a particular location which are to be processed by the automatic call distributor (ACD). The percentage of the IVR calls listed in column 44 to identify the percentage of calls which will be handled exclusively by the IVR system. In column 46, percentages are provided for calls which will be handled by both the IVR and ACD systems.

Other projections included in the table may comprise the call rate for the ACD 48, the call rate for the IVR 50, and an average projected hold time for calls processed by the system 52. Another forecasted element includes the projected hold time 52 for the current configuration of the system, which is the amount to time taken to process a call. Also included are projected blocking percentages 54 for calls processed by system. Based on the projected numbers, a yearly call volume could be projected as seen in column 56.

Returning again to FIG. 2, the information which is included in the table of FIG. 3 is employed in the cost modeling tool as demand and performance requirements 105. As can be seen, for the various years and geographic locations, the demand and performance requirements 105 are entered and processed by engineering solution 106 to identify the feasible configurations 108 for the system. The engineering solution 106 takes into a number of criteria such as failure modes for various components of the system, to generate feasible configurations for a particular geographic location. From these configurations, a local configuration 109 may be chosen. From this local configuration a configuration for particular geographic location 112 is established which may include additional IVR, router configuration, and ACD requirements 110.

Once these configurations and forecasts are complete, a complete equipment list 114 may be generated with associated costs. As was as described in FIG. 1, the tool described herein includes a database which provides cost information with regards to particular pieces of equipment. Once this information is gathered, a final report 116 may be generated and displayed which includes for each city for a specified year, the overall cost to build and run the system, a equipment list, as well as revenue generated based on projected traffic. Cloud 118 may be employed to take advantage of opportunities to optimize cost through quantity pricing, maintenance and placement costs, as well as geographic selection.

Disclosed in FIG. 4 is a conceptual model of how the modeling system processes and generates information. Shown in particular are various protocol layers employed to perform the different calculations with regards to modeling the call center. As was described above, the system here may be implemented using a database program such as Access or Excel wherein various mathematical relationships programmed through macros such that desired calculations can be performed. On one level is the user interface layer 200 through which a system user accesses and enters information, and where the results of calculations performed may be presented in a desired format.

In operation, the system user may enter information such as forecast numbers and desired performance through the user interface 200 and this information is processed in the cost and financial 204 wherein initial calculations may be made with regards to cost implications for the information entered. At the engineering rules layer 206, the calculations and various iterations are performed with regards to modeling the system according to the information entered through the user interface 200. Included in this particular processing layer are a number of user defined functions, which as mentioned above, model the system by taking into account a number of user specified functions such as failure modes. Once the engineering rules have been applied, cost and financial information 204 may be applied to the model to provide cost information necessary to create the particular system and an indication of the future revenues which may be generated. This information is then converted to a desired format and is presentable on the user interface 200.

Disclosed in a FIG. 5 is a flowchart which describes in detail steps performed by the modeling system in configuring an optimal system and providing financial information. The system is first provided with a baseline configuration for each geographical location for which modeling is to be performed. Included with this forecast information is the number of customers and type of customers which will employ different configurations of the call center equipment. Further input is projected values for traffic as well as a desired blocking value. Information included in the forecasted information is disclosed in the chart of FIG. 3. Also entered is the desired blocking value which the optimal call center system shall meet. At this point, an initial calculation is performed employing the following equation to identify a number of application servers necessary to be employed in the call center system, taking into account the amount of traffic (which may be assumed to be an Erlang C in this method of analysis) and the desired blocking value:

$$Pr(block) = \frac{\frac{E^m}{m!}}{\left(1 - \frac{E}{m}\right) * \sum_{k=0}^{m-1} \frac{E^k}{k!} + \frac{E^m}{m!}}$$

where:
E=the traffic forecast in Erlangs
Pr(block)=the desired blocking value
m=number of the application servers.

It should be noted that the above equation is only one method of determining blocking and that nearly any of the existing methods of calculating blocking may be employed as well as any custom methods which may be developed for particular situations. Further, a system with sufficient capacity may be configured to provide different blocking values for different parties.

The above equation is solved for the minimum number of servers (m) necessary to attain the desired blocking for the system. It may be solved as a recursion wherein changing values of m are plugged into the equation until the desired blocking value is found. This calculation provides an initial system configuration, but does not take into account any failure modes for components within the system.

Once the number of application servers is identified using the above equation, the flowchart disclosed in FIG. 6 may be employed to analyze the call center system taking into account a number of different failure modes. Using this base number of parts, a number of extrapolations may be performed to identify the overall system configuration using the equipment relationships stored in the database. These relationships relate to the number of VRUs and VRU cards associated with a particular number of servers. From these initial values all other necessary electronic components may also be extrapolated. Once a system configuration is identified, a performability analysis may be performed with regards to this system.

The performability analysis is performed using the following recursion:

$$Total = Total + \frac{appservs!}{i!(appservs-i)!} A_{apps}^i (1 - A_{apps})^{appservs-i}$$

$$\frac{jmax!}{j!(jmax-j)!} * A_{vru}^j (1 - A_{vru})^{jmax-j} \frac{kmax!}{k!(kmax-k)!}$$

$$A_{vrup}^k (1 - A_{vrup})^{kmax-k} ErlangCblock(ports, erlangs)$$

for all $i$, $j$, and $k$.

total = calculated blocking value appserv = maximum number of application servers $i$ = number of application servers $j$ = number of VRU's $j_{max}$ = maximum number of VRU's in the configuration -continued
and system state $k$ = number of VRU cards $k_{max}$ = maximum number of VRU cards in the configuration and system state $A_{apps}$ = availability of the application servers $A_{vru}$ = availability of the VRU's $A_{vrup}$ = availability of the VRU cards.

As was described above, any number of methods may be used in calculating blocking values. In employing the above recursion, a long term expected blocking value may be calculated for a particular configuration of the call center system, where a number of failure scenarios relating to one or more servers, VRUs, and VRU cards are taken into account. The performability recursion can be generalized for any system with a hierarchical structure. A hierarchical structure describes a system in which each subsystem layer services one or more subsystems at a lower layer. In our example, an application server services multiple VRU's, each of which services multiple VRU cards, each of which services multiple ports. Telecommunications equipment can often be generalized into this form, either directly or through creative modeling and definitions of subsystems.

The performability recursion can be generalized as:

$$Total = Total + \prod_{l \in L} \left[ \frac{M_l!}{i_l!(M_l - i_l)!} A_l^{i_l} (1 - A_l)^{(M_l - i_l)} \right] * Block(i_1, erlangs)$$

where:
L is the set of all possible equipment subsystem levels,
l defines the subsystem, ordered from the highest level, L, to the lowest, 1.
$M_l$ is the maximum number of elements/subsystems l that can function in the system configuration, with consideration of high level system affects. For example, a VRU fails, so all its cards are not counted in the $M_l$ for the configuration and system state because they cannot carry traffic. So, if l≠L, then $M_l$ is a function of $M_{l+1}$, which can be written as $M_l(M_{l+1})$.
$i_l$ is the number of components at the lowest level in the given configuration being evaluated, $i_l$=1, . . . $M_l$, and
Block is any appropriate blocking function such as Erlang B, Erlang C, Poisson, etc. The equation is evaluated for all possible subsystem configurations i of all subsystems I in the system.

Defined another way:

$$Total = \sum_X \left[ \prod_{l \in L} \left[ \frac{M_l!}{i_l!(M_l - i_l)!} A_l^{i_l} (1 - A_l)^{(M_l - i_l)} \right] * Block(i_1, erlangs) \right]$$

where X is the set of all states for configuration set L.
Written another way:

$$Total = \sum_{i_L=1}^{M_L} \sum_{i_{L-1}=1}^{M_{L-1}(M_L)} \ldots$$

-continued $$\sum_{i_1=1}^{M_1(M_2)} \left[ \prod_{l \in L} \left[ \frac{M_l!}{i_l!(M_l - i_l!)} A_l^{i_l} (1 - A_l)^{(M_l - i_l)} \right] * Block(i_1, erlangs) \right]$$

Returning again to the flowchart of FIG. 6, once a long term expected blocking value has been calculated for a particular configuration of the system, it is than compared against the desired blocking value. If the calculated long term expected blocking value is greater than the desired blocking value, the system is reconfigured such that the VRU card count is increased by one. A query may be made as to whether the number of cards is greater than the capacity for the present number of VRUs. If this is the case, the VRU count is increased by one and the network is reconfigured such that the VRU cards are more evenly distributed amongst a number of VRUs. It would not be an accurate model to configure the system such that the number of VRU's have a full card count while one VRU has just one or two cards.

Another query that is made once the VRU count is increased, is to whether the number of VRUs has exceeded the capacity of the number of servers employed in the system for running the VRUs. If this is the case, the server count is increased and the system is began reconfigured to more evenly distribute the VRUs amongst the remaining servers. Once the system reconfiguration is complete, the recursion is again employed to calculate the long term expected blocking value. Once this is complete, it is then compared to the ideal blocking value, and if it is still greater, the system is then reconfigured again. If the long term expected blocking value is less than or equal to the desired blocking value, this optimal configuration is returned, and the steps performed in the flowchart of FIG. 5 are resumed.

As was discussed above, calculations which may be performed include calculating equipment costs for setting up the call center in the particular PSTN, as well as any other costs. These calculations may include basic setup costs associated with all call center networks, as well as specific equipment costs based on the optimal configuration calculated. In the user interface, this information may be presented in any number of different formats. It may be according to total costs or on an itemized list. Further calculations may also be provided with regards to revenues generated with regards to the optimal system configuration taking into account the forecasted traffic. Further, this information may be presented for a particular geographic location or over a particular time period.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of determining equipment requirements in a telephony system comprising the steps of:

receiving a demand forecast and desired blocking values for a telephony system in a first geographic region;

calculating a number of a first component in the system through use of the forecast and the desired blocking value;

determining a tong term expected blocking for the system based on the traffic forecast wherein determining comprises the steps of:
        identifying numbers for at least one additional component in the system based on the number of the first component;
        identifying availability values for the first components and the additional components;
        calculating long term expected blocking by systematically calculating blocking values for the system based configurations of the system which take into account at least one failure scenario;

comparing the long term expected blocking value to the desired blocking value, and if the long term expected blocking value is greater than the desired blocking value, increasing at least one of: the first component and the additional component in a systematic manner, performing the step of determining a lone term expected blocking again; and identifying an optimal configuration associated with the long term expected blocking value.

2. The method of claim 1 further comprising the step of calculating a total cost of the optimal configuration.

3. The method of claim 1 further comprising the steps of determining financial information.

4. The method of claim 1 wherein the optimal configuration relates to an automated call center configured in a one or more central office switches in the PSTN.

5. The method of claim 4 wherein the demand value comprises telephonic traffic for the call center in a particular geographic region.

6. The method of claim 1 wherein the first components are application servers.

7. The method of claim 6 wherein the at least one additional component comprises at least one of: a VRU, a VRU card and a VRU port.

8. The method of claim 1 wherein the optimal configuration is identified for a plurality out of time periods.

9. The method of claim 1 wherein the optimal configuration is identified for a plurality of geographic regions.

10. The method of claim 1 wherein the step of calculating a number of a first component in the system is performed employing the following equation:

$$Pr(block) = \frac{\frac{E^m}{m!}}{\left(1 - \frac{E}{m}\right) * \sum_{k=0}^{m-1} \frac{E^k}{k!} + \frac{E^m}{m!}}$$

where:
    E=the traffic forecast in Erlangs
    Pr(block)=the desired blocking value
    m=number of the application servers.

11. The method of claim 10 wherein the step of calculating long term expected blocking is performed using the following recursion:

$$Total = Total + \frac{appservs!}{i!(appservs-i)!} A_{apps}^i (1-A_{apps})^{appservs-i}$$

$$\frac{jmax!}{j!(jmax-j)!} * A_{vru}^j (1-A_{vru})^{jmax-j} \frac{kmax!}{k!(kmax-k)!}$$

$$A_{vrup}^k (1-A_{vrup})^{kmax-k} ErlangCblock(ports, erlangs)$$

where;
Total=calculated blocking value
appserv=maximum number of application servers
i=number of application servers
j=number of VRU's
$j_{max}$=maximum number of VRU's
k=number of VRU cards
$k_{max}$=maximum number VRU cards
$A_{apps}$=availability of the application servers
$A_{vru}$=availability of the VRU's
$A_{vrup}$=availability of the VRU cards.

12. The method of claim 10 wherein the step of calculating long term expected blocking is performed using the following recursion:

$$Total = Total + \prod_{l \in L} \left[ \frac{M_l!}{i_l!(M_l-i_l)!} A_l^{i_l}(1-A_l)^{(M_l-i_l)} \right] * Block(i_1, erlangs)$$

where:
L is the set of all possible equipment subsystem levels,
l defines the subsystem, ordered from the highest level, L to the lowest, l,
$M_l$ is the maximum, number of elements/subsystems l that can function in the system configuration, with consideration of high level system affects
$i_l$ is the number of components at the lowest level in the given configuration being evaluated, $i_l$=1, ..., $M_l$, and
Block is any appropriate blocking function such as Erlang B, Erlang C, Poisson, etc
wherein the equation is evaluated for all possible subsystem configurations i of all subsystems l in the system.

13. The method of claim 12 wherein the step of calculating long term expected blocking is performed using the following recursion:

$$Total = \sum_X \left[ \prod_{l \in L} \left[ \frac{M_l!}{i_l!(M_l-i_l)!} A_l^{i_l}(1-A_l)^{(M_l-i_l)} \right] * Block(i_1, erlangs) \right]$$

14. The method of claim 12 wherein the step of calculating long term expected blocking is performed using the following recursion:

$$Total = \sum_{i_L=1}^{M_L} \sum_{i_{L-1}=1}^{M_{L-1}(M_L)} \cdots$$

$$\sum_{i_1=1}^{M_1(M_2)} \left[ \prod_{l \in L} \left[ \frac{M_l!}{i_l!(M_l-i_l)!} A_l^{i_l}(1-A_l)^{(M_l-i_l)} \right] * Block(i_1, erlangs) \right].$$

15. A modeling system for configuring a call center for at least one geographic region, comprising:
an interface configured for receiving a demand values and a desired blocking value with regards to forecasted telephonic traffic for the call center;
a data repository which includes relational information as to extrapolating call center configuration;
a base configuration processor configured to generate a based call center configuration for public switched telephone network, which receives the demand values and the desired blocking value and calculates a number of first components employable in a base configuration for the call center, wherein the base configuration is identified by accessing the data repository and extrapolating to identify additional components employable in the base configuration;
a performability calculator configurable to calculate a long term expected blocking value for the base configuration, wherein the calculated long term expected blacking value takes into account at least one failure mode for each of the first component and the additional components, wherein the optimum system processor is further configured to compare the calculated long term expected blocking value against the desired blocking value, and if the calculated long term expected blocking value is greater than the desired blocking rate, reconfiguring the call center system to identify an optimal system by employing relationships retrieved from the data repository, until the long term expected blocking value is less than or equal to the desired blocking; and
said interface further configured to present information relating to the optimal system.

16. The system of claim 15 further including a financial calculator configured to access the data repository to retreated price information relating to the first and additional components and to calculate and provide cost information with regards to the optimal system.

17. The system of claim 15 wherein the first component comprises an application server and the plurality of additional components comprise at least one of: a voice response unit (VRU), a VRU card and a VRU port.

18. The system of claim 17 wherein the first number is determined by:

$$Pr(block) = \frac{\frac{E^m}{m!}}{\left(1-\frac{E}{m}\right) * \sum_{k=0}^{m-1} \frac{E^k}{k!} + \frac{E^m}{m!}}$$

where:
E=the traffic forecast in Erlangs
Pr(block)=the desired blocking value
m=number of the application servers.

19. The system of claim 18 wherein the long term expected blocking value is determined by:

$$Total = Total + \frac{appservs!}{i!(appservs-i)!} A_{apps}^i (1 - A_{apps})^{appservs-i}$$
$$\frac{j\max!}{j!(j\max-j)!} * A_{vru}^j (1 - A_{vru})^{j\max-j} \frac{k\max!}{k!(k\max-k)!}$$
$$A_{vrup}^k (1 - A_{vrup})^{k\max-k} ErlangCblock(ports, erlangs)$$

where:
Total=calculated blocking value
appserv=maximum number of application servers
i=number of application servers
j=number of VRU's
$j_{max}$=maximum number of VRU's
k=number of VRU cards
$k_{max}$=maximum number VRU cards
$A_{apps}$=availability of the application servers
$A_{vru}$=availability of the VRU's
$A_{vrup}$=availability of the VRU cards.

20. The system of claim 15 wherein the performability calculator is further configured to determine the optimal configuration for the call centers in a plurality of geographic locations.

21. The system of claim 15 wherein the performability calculator is further configured to determine the optimal configuration for the call centers over a plurality of time periods.

22. The system of claim 15 wherein the interface and the calculator are implemented as at least one of: an Excel tool and an Access tool.

23. The system of claim 18 wherein the long term expected blocking value is determined by:

$$Total = Total + \prod_{l \in L} \left[ \frac{M_l!}{i_l!(M_l - i_l)!} A_l^{i_l} (1 - A_l)^{(M_l - i_l)} \right] * Block(i_1, erlangs)$$

where:
Total=calculated blocking value
l is the set of all possible equipment subsystem levels,
$M_l$ is the maximum number of elements/subsystems l in the system configuration,
$i_l$ is the number of components at the lowest level in the given configuration being evaluated,
Block is any appropriate blocking function such as Erlang B, Erlang C, Poisson, etc.

24. The method of claim 23 wherein the long term expected blacking value is determined by:

$$Total = \sum_X \left[ \prod_{l \in L} \left[ \frac{M_l!}{i_l!(M_l - i_l)!} A_l^{i_l} (1 - A_l)^{(M_l - i_l)} \right] * Block(i_1, erlangs) \right].$$

25. The method of claim 23 wherein the step of calculating long term expected blocking is performed using the following recursion:

$$Total = \sum_{i_L=1}^{M_L} \sum_{i_{L-1}=1}^{M_{L-1}(M_L)} \cdots$$
$$\sum_{i_1=1}^{M_1(M_2)} \left[ \prod_{l \in L} \left[ \frac{M_l!}{i_l!(M_l - i_l)!} A_l^{i_l} (1 - A_l)^{(M_l - i_l)} \right] * Block(i_1, erlangs) \right].$$

* * * * *